US012761445B2

(12) United States Patent
Kim

(10) Patent No.: US 12,761,445 B2
(45) Date of Patent: Oct. 13, 2026

(54) MIRROR ASSEMBLY

(71) Applicant: LG ELECTRONICS INC., Seoul (KR)

(72) Inventor: Keumhwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/124,212

(22) PCT Filed: Sep. 4, 2023

(86) PCT No.: PCT/KR2023/013199
§ 371 (c)(1),
(2) Date: Apr. 24, 2025

(87) PCT Pub. No.: WO2025/053298
PCT Pub. Date: Mar. 13, 2025

(65) Prior Publication Data
US 2026/0009968 A1 Jan. 8, 2026

(51) Int. Cl.
*G02B 7/182* (2021.01)

(52) U.S. Cl.
CPC .................................. *G02B 7/1821* (2013.01)

(58) Field of Classification Search
CPC ........... G02B 7/1821; B60R 1/04; B60R 1/08; B60R 1/12; B60R 11/00; F16M 11/06; F16M 11/18
See application file for complete search history.

(56) References Cited

U.S. PATENT DOCUMENTS 5,582,383 A 12/1996 Mertens et al.
10,029,615 B2 7/2018 Hallack
(Continued)

FOREIGN PATENT DOCUMENTS

EP 3 056 387 B1 4/2018
KR 10-2019-0077355 A 7/2019

OTHER PUBLICATIONS

International Search Report for PCT/KR2023/013199 (PCT/ISA/210) mailed on May 28, 2024.
(Continued)

*Primary Examiner* — Euncha P Cherry
(74) *Attorney, Agent, or Firm* — Birch, Stewart, Kolasch & Birch, LLP

(57) ABSTRACT

A mirror assembly may comprise a housing; a support bracket rotatably disposed on the housing and coupled to a mirror; and a tilting module mounted on the support bracket and tilting or untilting the support bracket relative to the housing. The tilting module may comprise a slider slidably mounted on the support bracket; a main spring disposed between the housing and the slider; a button cover mounted on the support bracket; a cover body coupled with the button cover; a button disposed between the button cover and the cover body so as to be moved up and down and supporting the slider; a stopper formed with a stopper protrusion that catches the button and rotatably disposed between the button cover and the cover body; and a reset button disposed on the cover body to move the stopper in the forward and backward direction. A sliding protrusion is formed on the slider, and a rail along which the sliding protrusion is guided is formed on the housing.

10 Claims, 14 Drawing Sheets

(56) References Cited

U.S. PATENT DOCUMENTS

| | | | |
|---|---|---|---|
| 10,800,335 B2 | 10/2020 | Hallack et al. | |
| 2005/0078389 A1* | 4/2005 | Kulas | B60R 1/04 359/877 |
| 2016/0236620 A1 | 8/2016 | Gómez Timoneda et al. | |
| 2018/0118115 A1 | 5/2018 | Kuester et al. | |
| 2019/0118713 A1 | 4/2019 | Steffes | |

OTHER PUBLICATIONS

Written Opinion of the International Searching Authority for PCT/KR2023/013199 (PCT/ISA/237) mailed on May 28, 2024.

* cited by examiner

【FIG. 1】
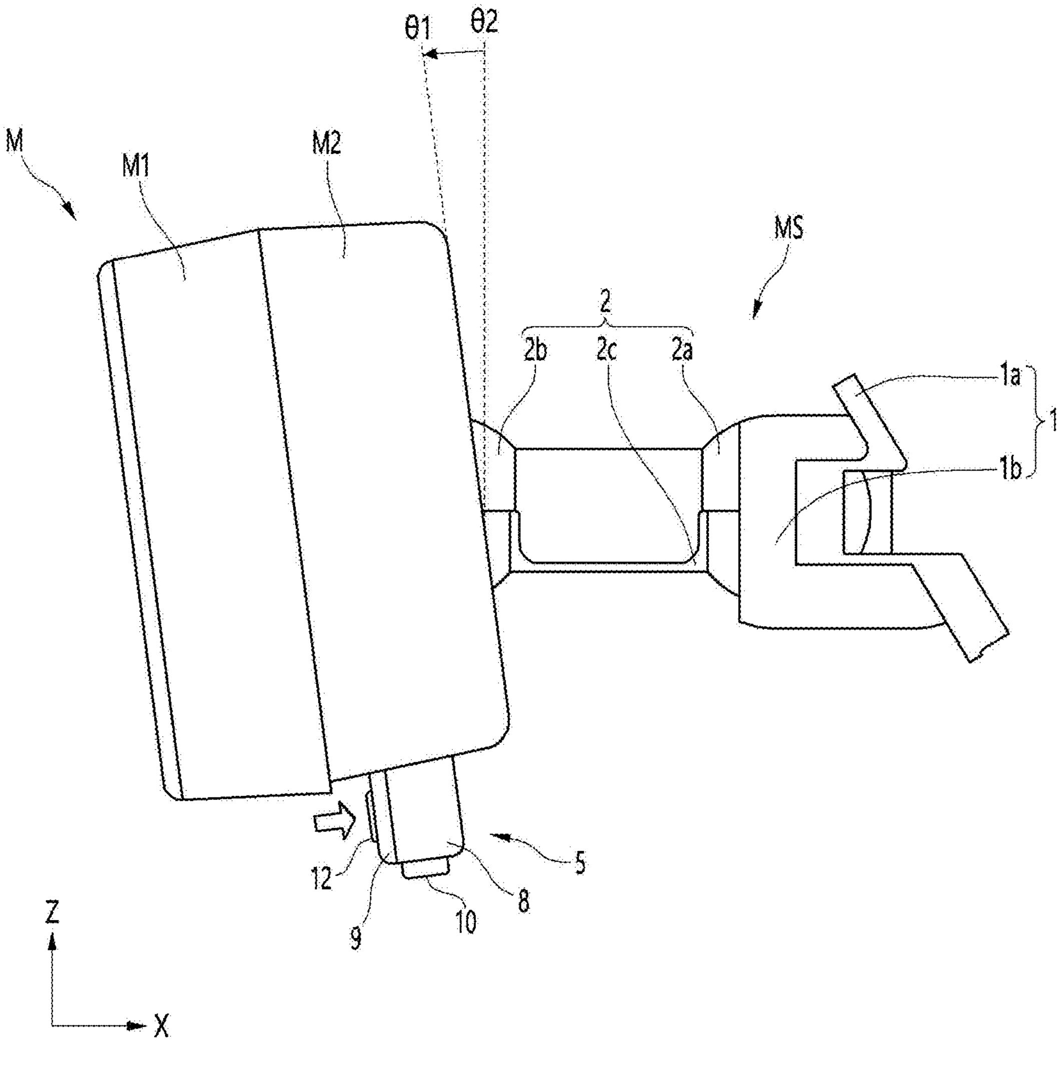

【FIG. 2】
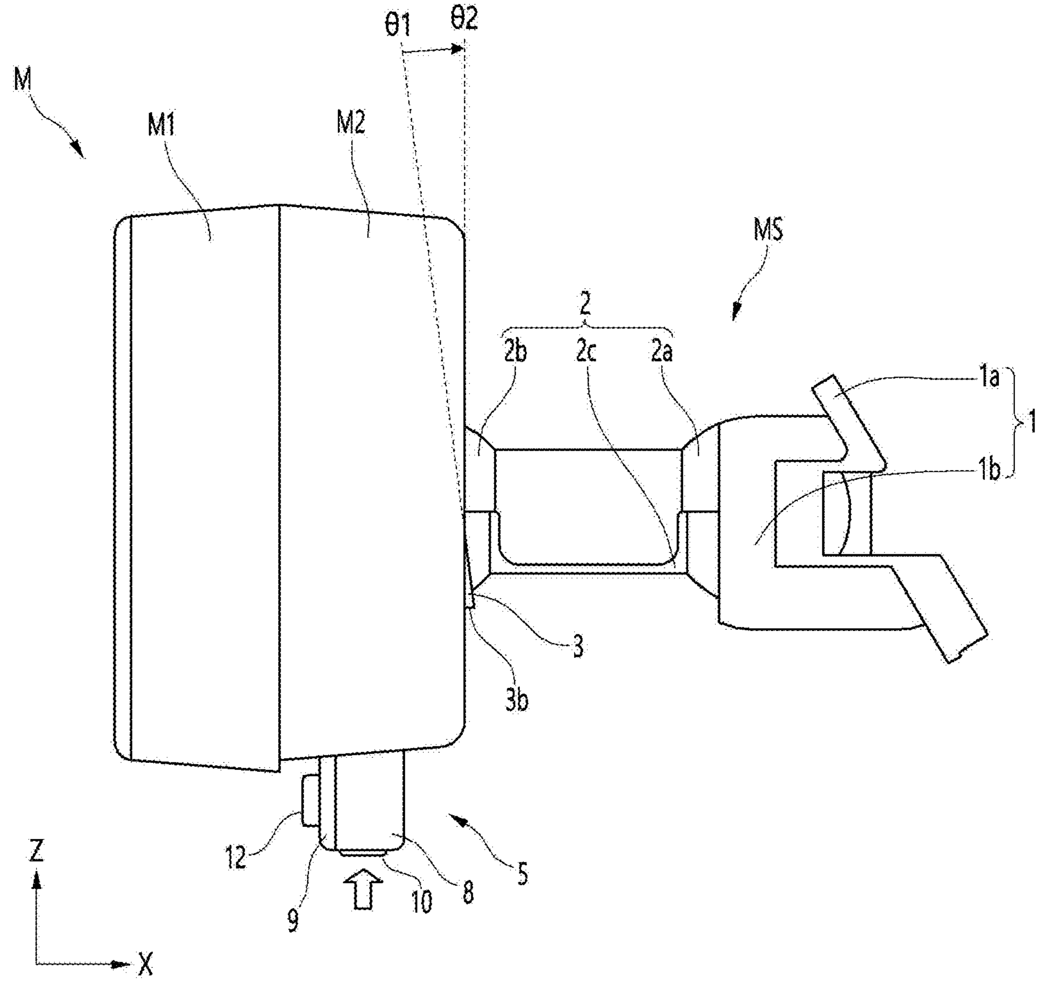

【FIG. 3】
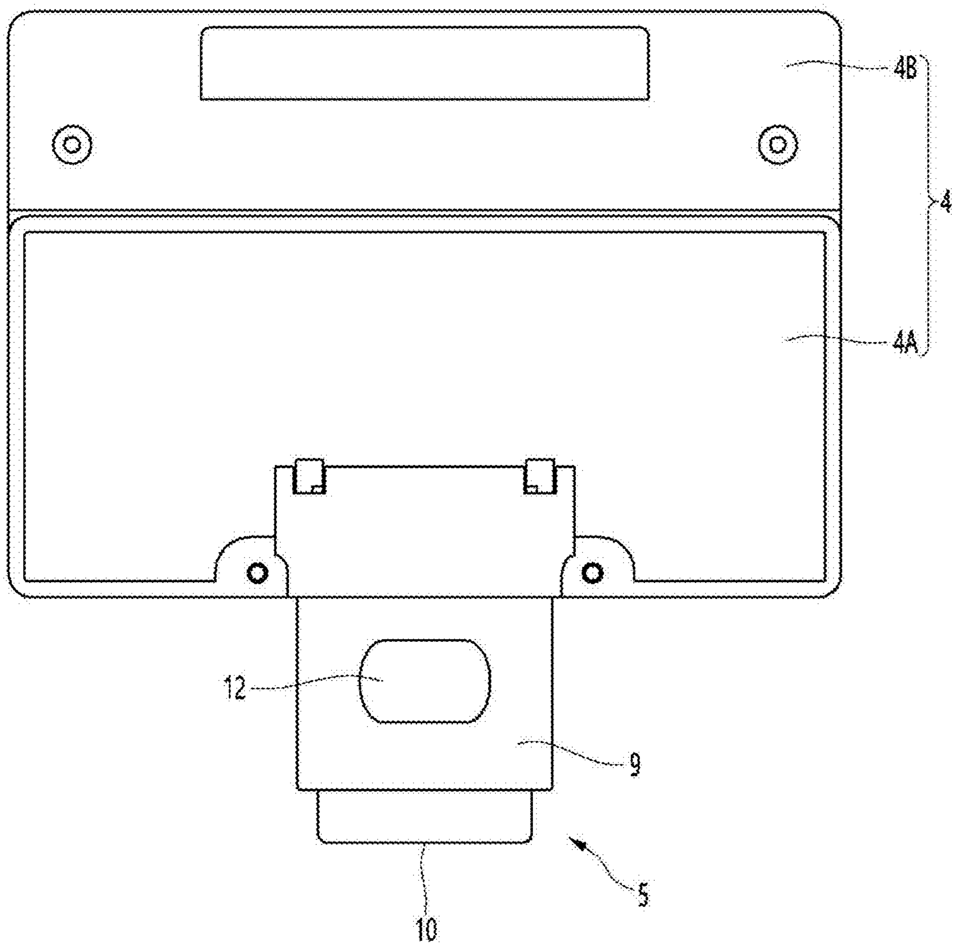

【FIG. 4】
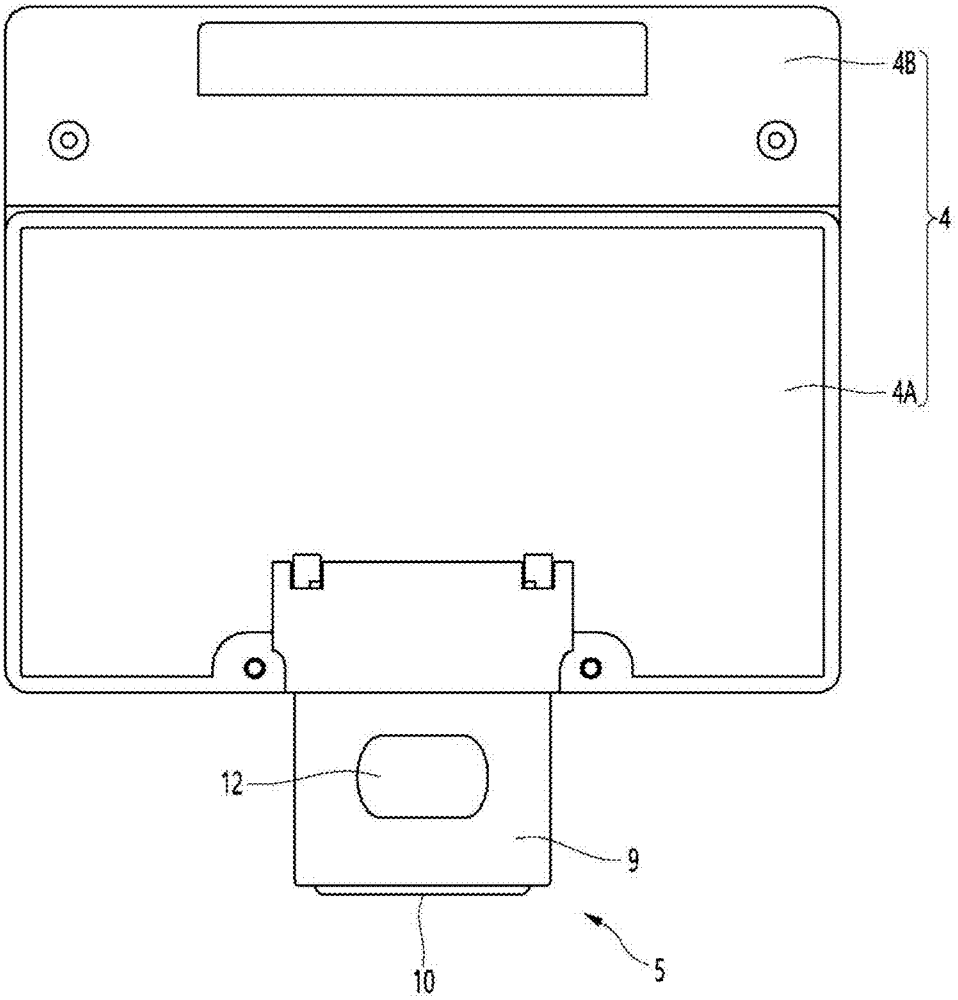

【FIG. 5】
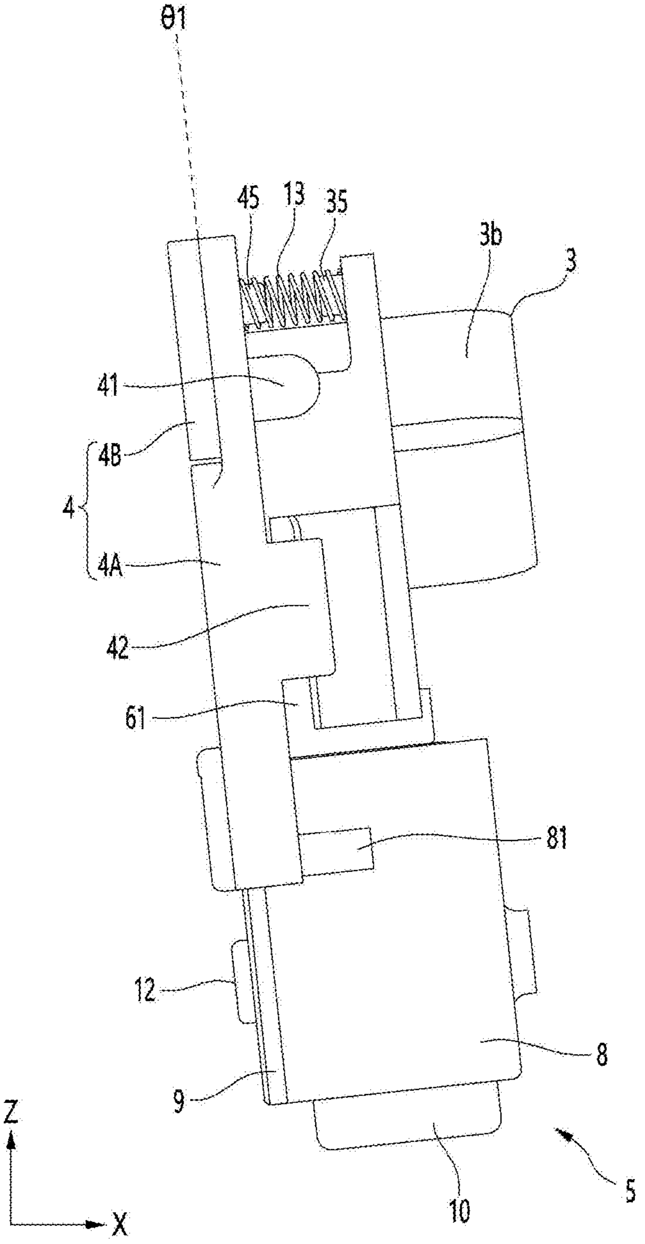

【FIG. 6】
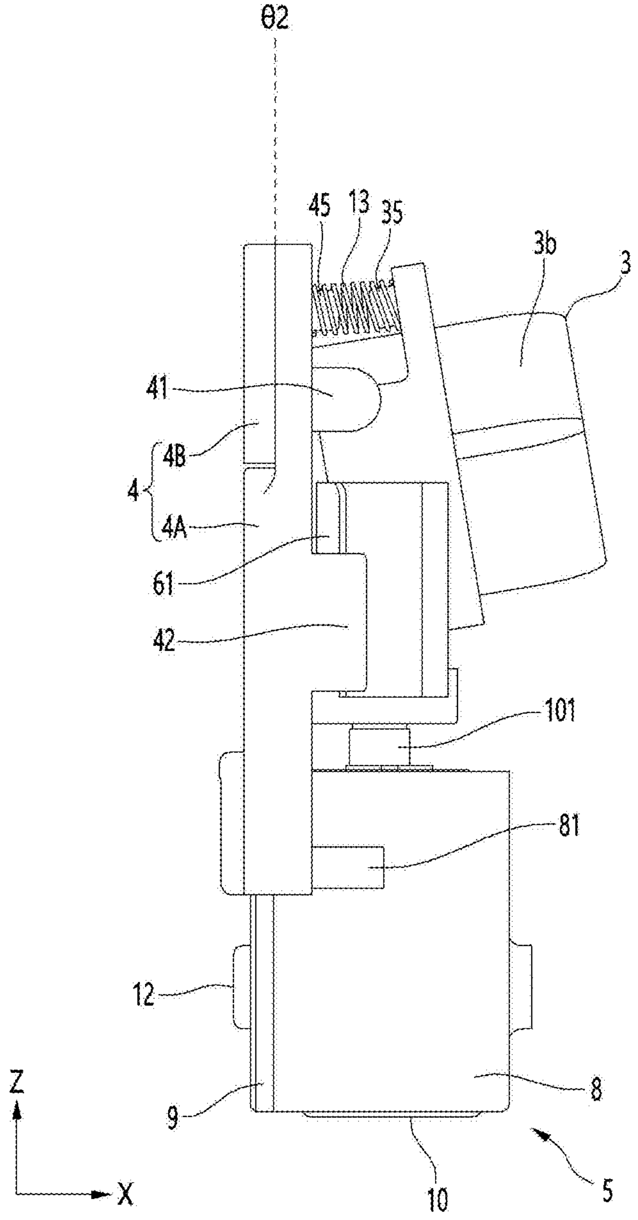

【FIG. 7】
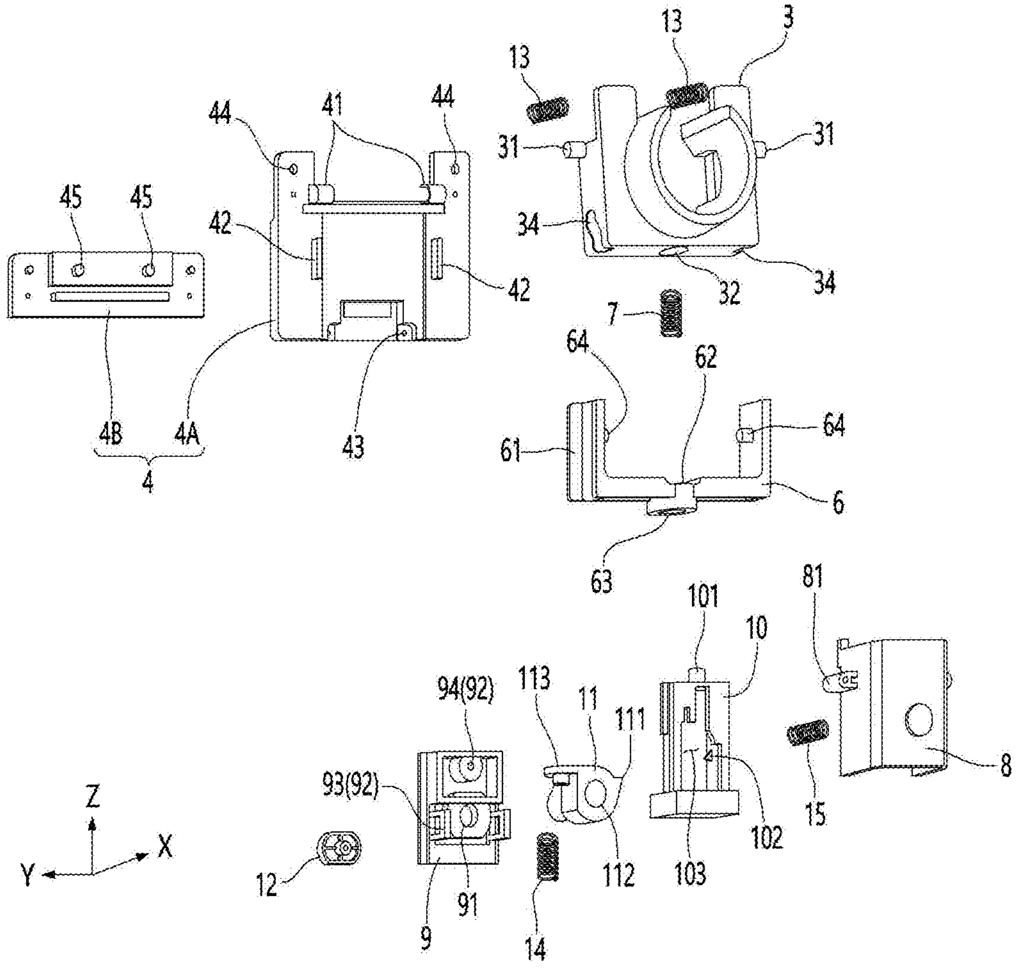

【FIG. 8】
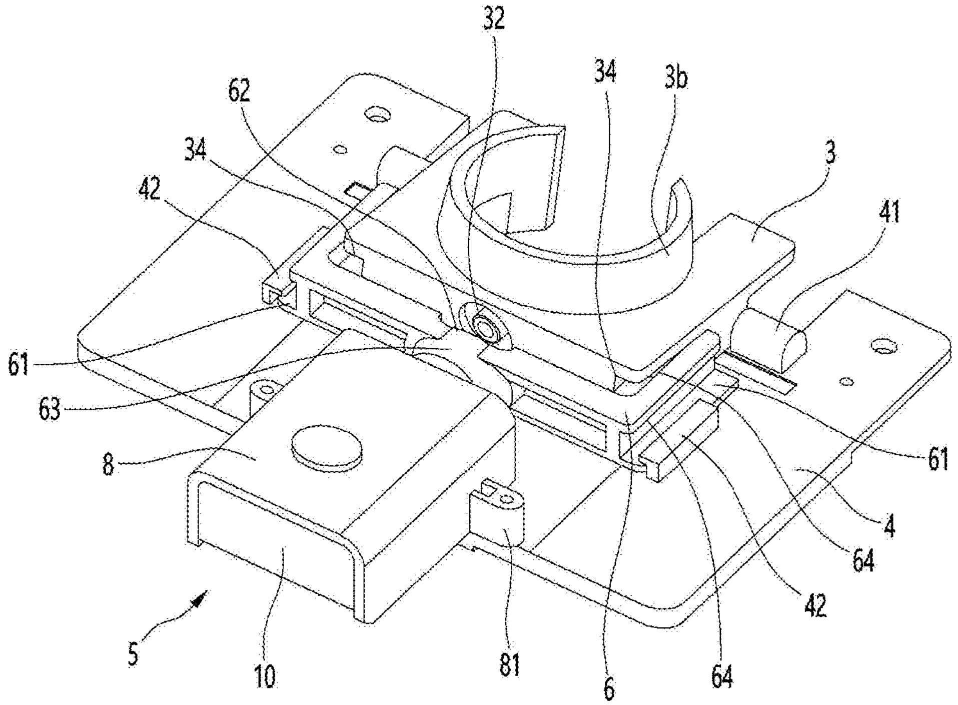

【FIG. 9】
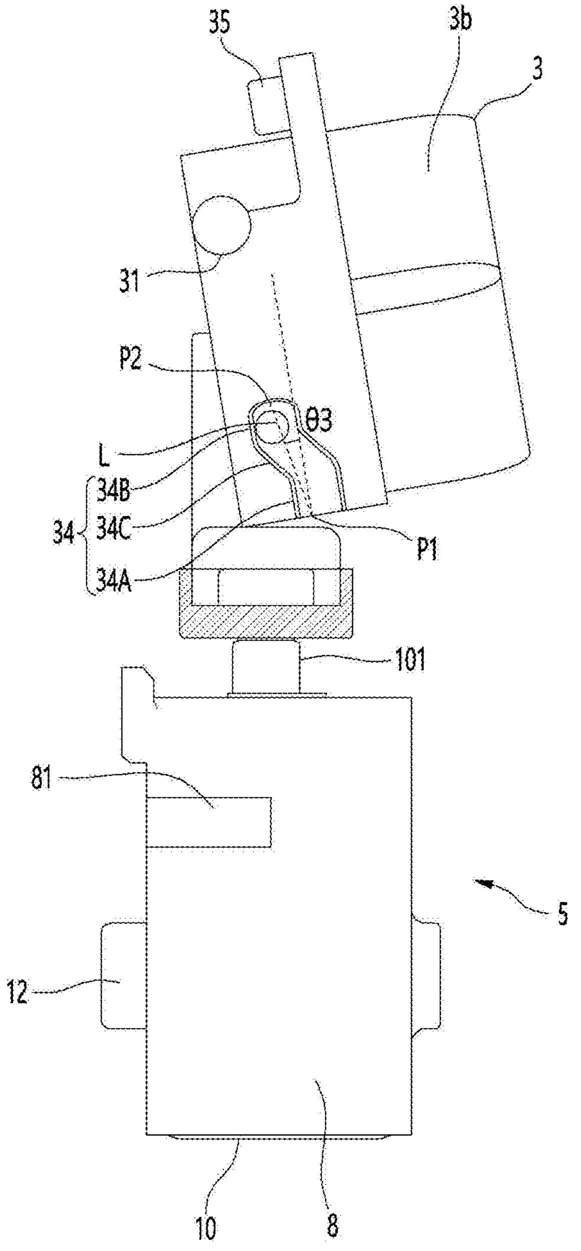

【FIG. 10】
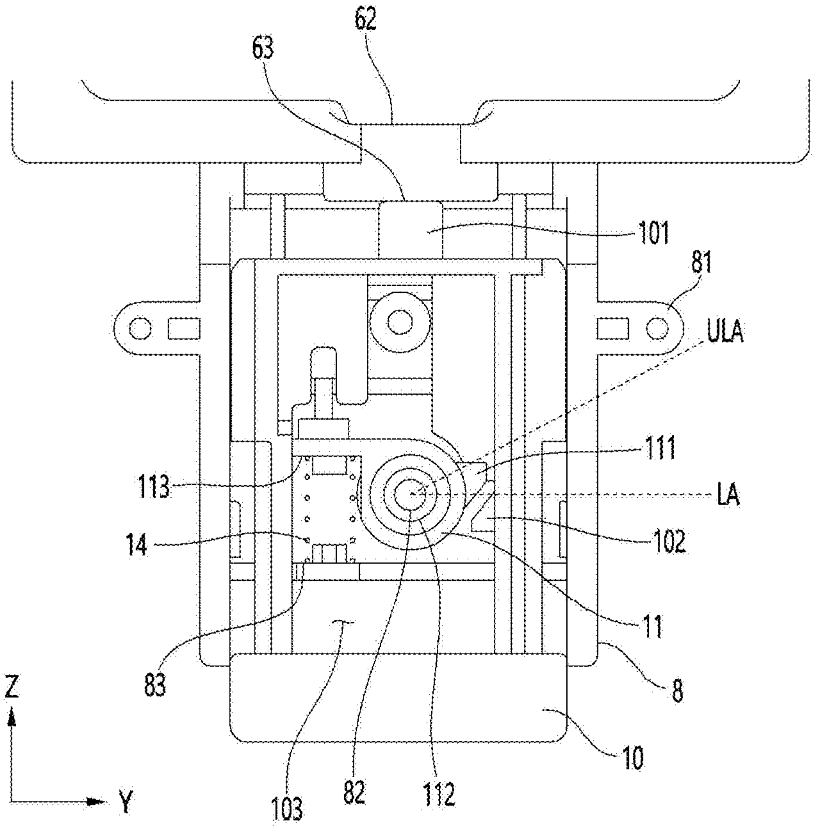

【FIG. 11】
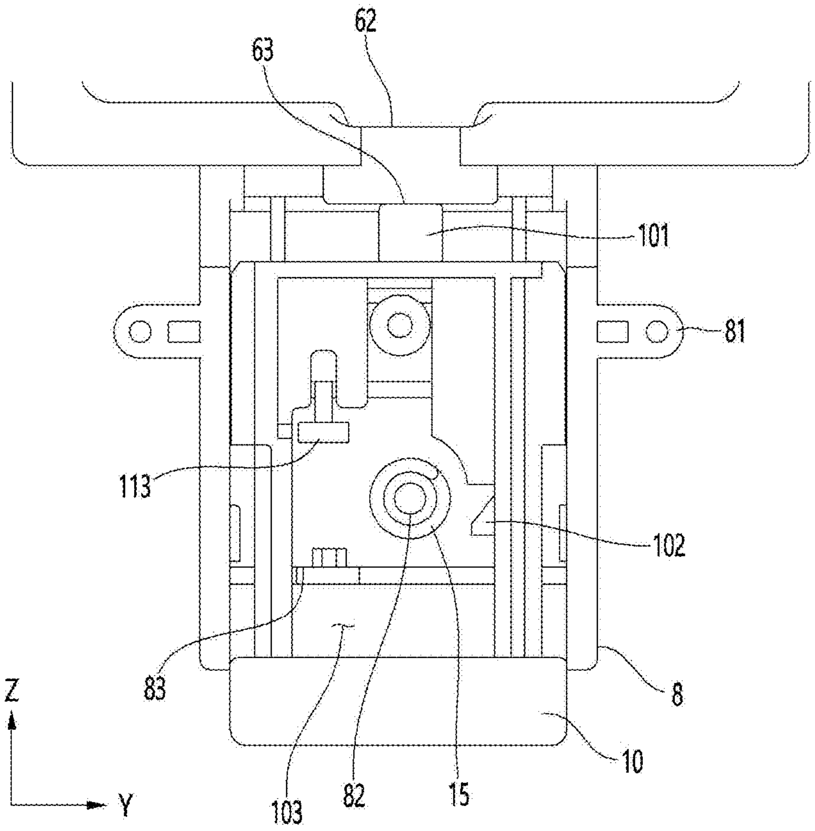

【FIG. 12】
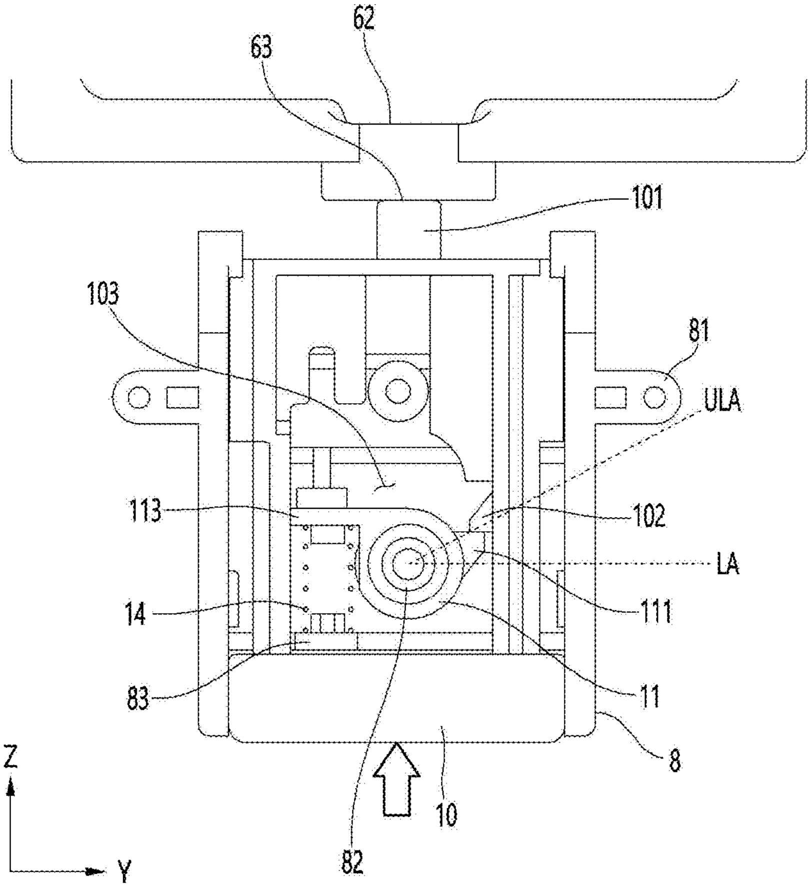

【FIG. 13】
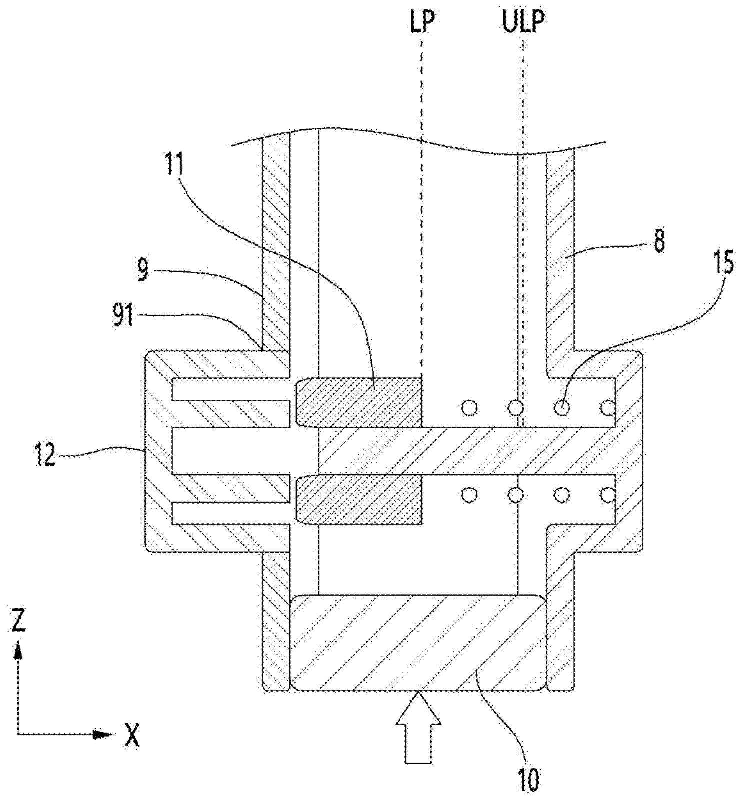

【FIG. 14】
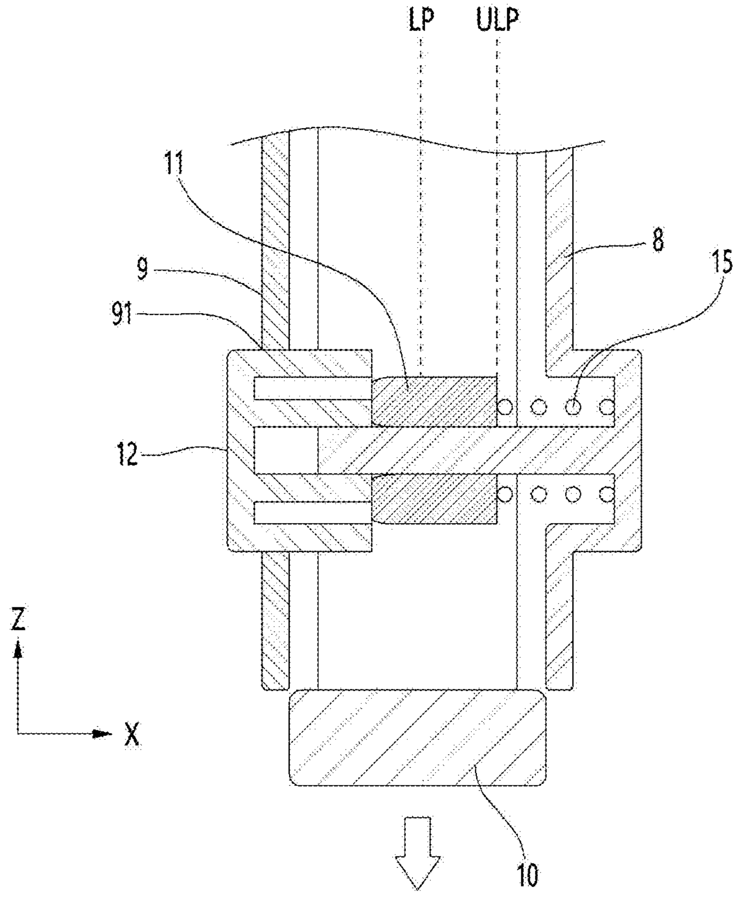

MIRROR ASSEMBLY

CROSS REFERENCE TO RELATED APPLICATION

This application is the National Phase of PCT International Application No. PCT/KR2023/013199, filed on Sep. 4, 2023, all of which is hereby expressly incorporated by reference into the present application.

TECHNICAL FIELD

The present invention relates to a mirror assembly installed in a vehicle, etc.

BACKGROUND ART

An example of the mirror assembly may comprise a room mirror and a room mirror support that can be fixed to a glass or roof panel of a vehicle, and the angle of the room mirror may be adjustable.

An example of an angle-adjustable room mirror is a rear view assembly disclosed in U.S. Pat. No. 10,800,335 B2 (Oct. 13, 2020, published), which comprises a display mirror assembly and an actuator assembly comprising a toggle switch operably connected to the display mirror assembly to tilt a glass element.

DISCLOSURE

Technical Problem

The present embodiment provides a mirror assembly that can tilt a mirror to a tilting angle by pressing a button, and can easily return the mirror to a reference angle by pressing a reset button.

Technical Solution

A mirror assembly according to this embodiment may comprise a housing; a support bracket rotatably disposed on the housing and coupled to a mirror; and a tilting module mounted on the support bracket and tilting or untilting the support bracket relative to the housing.

The tilting module may comprise a slider slidably mounted on the support bracket; a main spring disposed between the housing and the slider; a button cover mounted on the support bracket; a cover body coupled with the button cover; a button disposed between the button cover and the cover body so as to be moved up and down and supporting the slider; a stopper formed with a stopper protrusion that catches the button and rotatably disposed between the button cover and the cover body; and a reset button disposed on the cover body to move the stopper in the forward and backward direction.

A sliding protrusion may be formed on the slider, and a rail along which the sliding protrusion is guided may be formed on the housing.

The rail may comprise a pair of straight portions spaced apart each other; and a gradient connecting the pair of straight portions.

A virtual line connecting a starting point of the rail and an end point of the rail may be inclined with respect to the housing.

The tilting module may comprise a stopper spring disposed between at least one of the button cover and the cover body and the stopper, the stopper elastically supporting the stopper in the rotational direction of the stopper; and a reset spring disposed between the button cover and the stopper, the reset spring elastically supporting the stopper in the front and rear direction.

The stopper spring may elastically support the stopper at a locking angle at which the button is restrained by the stopper projection, The locking angle may be a clockwise angle or a counterclockwise angle at which the button is restrained by the stopper projection, The reset spring may elastically support the stopper at a locking position at which the button is restrained by the stopper projection, The locking position may be a front and rear position at which the button is restrained by the stopper projection.

The support bracket may comprise a main bracket having a hinge axis receiving portion formed to accommodate a hinge axis formed on the housing; and a cover bracket fastened to the main bracket.

A support axis may be formed on at least one of the button cover and the cover body and rotatably and movably supports the stopper.

An avoidance hole may be formed in the button for avoiding the stopper and the stopper spring.

A button protrusion may be formed in the button and may be restrained by the stopper protrusion in the up and down direction.

The tilting module further may comprise a damping spring disposed between the support bracket and the housing.

Advantageous Effect

According to this embodiment, if the driver presses the button, the mirror can be tilted to a tilting angle, and if the driver presses the reset button, the mirror can be returned to the reference angle, so that the driver can adjust the angle of the mirror more smoothly.

In addition, when the driver presses the reset button, the button is lowered by the restoring force of the main spring, so that the button can be lowered smoothly and is reliable.

In addition, since the stopper is supported by the stopper spring, the stopper can be smoothly returned to the locking angle, so that malfunction can be minimized.

In addition, since the stopper is supported by the reset spring, the stopper can be smoothly returned to the locking position, so that malfunction can be minimized.

In addition, the supporter bracket comprises the main bracket and the cover bracket that is connected to the main bracket, so that the supporter bracket and the housing can be easily assembled.

In addition, since the stopper can be rotated or advanced along the support axis, the button can be easily locked or unlocked.

In addition, the stopper and stopper spring can be accommodated in the avoidance hole formed in the button, so that the mirror assembly can be made as compact as possible.

In addition, the support bracket can rotate safely without being rotated abruptly by the damping spring.

DESCRIPTION OF DRAWINGS

FIG. 1 is a side view of a mirror assembly according to the present embodiment, FIG. 2 is a side view of a mirror assembly when the button illustrated in FIG. 1 is raised, FIG. 3 is a rear view when the mirror according to the present embodiment is separated, FIG. 4 is a rear view of a mirror assembly when the button illustrated in FIG. 3 is raised, FIG. 5 is a side view of a mirror assembly illustrated in FIG. 3, FIG. 6 is a side view of a mirror assembly illustrated in FIG. 4, FIG. 7 is an exploded perspective view of a mirror assembly according to the present embodiment, FIG. 8 is a perspective view illustrating a housing, a slider, a button, a button cover, and a support bracket according to the present embodiment, FIG. 9 is a partially cut-away side view illustrating a housing, a slider, a button, a button cover, and a reset button according to the present embodiment, FIG. 10 is a rear view illustrating the inside of a button cover when the button according to the present embodiment is lowered, FIG. 11 is a rear view when the stopper illustrated in FIG. 10 is separated, FIG. 12 is a rear view of the inside of the button cover when the button according to the present embodiment is raised, FIG. 13 is a cross-sectional view of the inside of the button cover when the button according to the present embodiment is raised, FIG. 14 is a cross-sectional view of the inside of the button cover when the reset button according to the present embodiment is pressed.

BEST MODE

Hereinafter, specific embodiments of the present invention will be described in detail with reference to the drawings.

FIG. 1 is a side view of a mirror assembly according to the present embodiment, and FIG. 2 is a side view of a mirror assembly when the button illustrated in FIG. 1 is raised, A mirror assembly may be installed in a vehicle to provide a rear view to a driver. An example of the mirror assembly may be a device for protecting the driver's eyes from the lights of a following vehicle when driving at night. An example of the mirror assembly may comprise an ECM room mirror.

The mirror assembly may comprise a mirror M and a mirror support MS that supports the mirror M.

The mirror M may comprise an outer housing M1 and M2 and a display panel (not shown) disposed in the outer housing.

The outer housing M1 and M2 may comprise a first housing M1 and a second housing M2.

The first housing M1 may be a housing facing the driver and may be a front housing based on the driver.

A rear opening may be formed on the rear surface of the first housing M1 through which a user may view the display panel (not shown).

The second housing M2 may be a housing disposed in front of the first housing M1 and may be a rear housing based on the driver.

A front opening through which the housing 3 penetrates may be formed on the front of the second housing M2.

The display panel may be disposed inside the outer housing M1 and M2 and may provide a screen to the rear through the rear opening.

An example of the display panel may be a display element that may provide various information of the vehicle, such as an LCD or OLED.

The mirror M may further comprise a bracket (or supporter) disposed inside the outer housing M1 and M2. The backet (or supporter) may support the display panel.

The mirror assembly may comprise a housing glass 1, a ball shaft 2 supported by the housing glass 1, a housing 3, a support bracket 4, shown in FIGS. 3 and 4, and a tilting module 5.

The housing glass 1 may be attached to a glass or panel of a vehicle.

The housing glass 1 may comprise a glass attachment body 1*a* attached to the glass or panel.

The ball shaft 2 may be connected to the housing glass 1. A front ball receiving portion 1*b* may be formed in the housing glass 1 into which a front ball 2*a* of the ball shaft 2 may be inserted and received.

The ball shaft 2 may be supported by the housing glass 1.

The ball shaft 2 may have a pair of balls 2*a* and 2*b* connected by a shaft 2*c*. A pair of balls 2*a* and 2*b* and a shaft 2*a* may be formed integrally.

The pair of balls 2*a* and 2*b* may be spaced apart with a shaft 2*c* therebetween. A pair of balls 2*a* and 2*b* may be formed at a longitudinal end of a shaft 2*c*. A pair of balls 2*a* and 2*b* may be spaced apart in a front and rear direction X. Each of the pair of balls 2*a* and 2*b* may have an overall shape of a sphere or a shape close to a sphere. An outer circumferential surface of each of the pair of balls 2*a* and 2*b* may be curved surface.

The pair of balls 2*a* and 2*b* may comprise a front ball 2*a* and a rear ball 2*b*.

The front ball 2*a* may be inserted into a front ball receiving portion 1*b* and supported by the front ball receiving portion 1*b*.

The rear ball 2*b* may be inserted into the ball receiving portion 3*b* (rear ball receiving portion) formed in the housing 3 and can support the housing 3.

The shaft 2*c* may be formed between the front ball 2*a* and the rear ball 2*b*.

The shaft 2*c* may have a straight shape or a bent shape.

The mirror support MS may comprise a housing 3, a support bracket 4, shown in FIGS. 3 to 7, and a tilting module 5, and the housing 3, the support bracket 4, and the tilting module 5 may tiltably support the mirror M.

The housing 3 may be a housing mirror that is closer to the mirror M among the mirror M and the glass.

The housing 3 may comprise a rear ball receiving portion 3*b* supported by a ball 2*b* of a ball shaft 2, and the rear ball 2*b* of the ball shaft 2 may be inserted into the rear ball receiving portion 3*b* and received in the rear ball receiving portion 3*b*. The housing 3 may be a ball housing surrounding the rear ball 2*b* of the ball shaft 2.

The support bracket 4 may be coupled with the mirror M and may be tilted or restored together with the mirror M. The support bracket 4 may be coupled to at least one of the display panel and the bracket (or supporter).

The tilting module 5 may tilt or untilt the mirror M.

The tilting module 5 may comprise a button 10 that the driver presses upward.

The button 10 may be disposed to be raised and lowered in the up and down direction Z on the lower side of the mirror M.

When the driver presses the button 10 upward, the tilting module 5 may tilt the mirror M to a tilting angle $\theta 2$ centered on the reference angle $\theta 1$, as shown in FIG. 2.

The tilting module 5 may comprise a reset button 10 that the driver presses forward.

The reset button 12 may be disposed to be advanced and retreated in the front and rear direction X at the lower side of the mirror M.

The reset button 10 may be disposed to be advanced and retreated on the back surface of the tilting module 5.

When the driver presses the reset button 12 forward, the tilting module 5 may return the mirror M from the tilting angle θ2 to the reference angle θ1, as shown in FIG. 1.

The driver may tilt the mirror M to a tilting angle θ2 by pressing the button 10 once, and return the mirror M to the reference angle θ1 by pressing the reset button 12 once. Hereinafter, the housing 3 and the tilting module 5 are described.

FIG. 3 is a rear view when the mirror according to the present embodiment is separated, FIG. 4 is a rear view of a mirror assembly when the button illustrated in FIG. 3 is raised, FIG. 5 is a side view of a mirror assembly illustrated in FIG. 3, FIG. 6 is a side view of a mirror assembly illustrated in FIG. 4, and FIG. 7 is an exploded perspective view of a mirror assembly according to the present embodiment, A hinge axis 31 may be formed on the housing 3.

The hinge axis 31 may be the center of rotation of the support bracket 4. The hinge axis 31 may be formed on both sides of the housing 3. The hinge axis 31 may be disposed approximately horizontally. The hinge axis 31 may be elongated in the left and right direction Y.

An upper spring seat 32 may be formed on the housing 3.

The upper spring seat 32 may contact the upper portion of the main spring 7.

The upper spring seat 32 may be formed on the bottom surface of the housing 3.

A rail 34 may be formed on the housing 3.

The rail 34 may guide the sliding projection 64 formed on the slider 6.

The rail 34 may be formed along the side surface and the bottom surface of the housing 3.

The upper end of the rail 34 may be formed on the side surface of the housing 3.

The lower end of the rail 34 may be formed on the side surface lower end of the housing 3 and the lower surface of the housing 3.

The rail 34 may be formed in a recessed shape on the side surface and the lower surface of the housing 3.

The height of the rail 34 may be lower than the height of the hinge axis 31.

The rail 34 may be provided in pairs, and the pair of rails 34 may comprise a left rail and a right rail.

A front spring seat 35 supporting a damping spring 13 may be formed on the housing 3.

The support bracket 4 may be rotatably disposed on the housing 3.

The support bracket 4 may be coupled to the mirror M. The support bracket 4 may be tilted at a tilting angle θ2 with respect to the housing 3. The support bracket 4 may be returned from the tilting angle θ2 to the reference angle θ1 together with the mirror M.

The support bracket 4 may be formed with a hinge axis receiving portion 41 that receives a hinge axis 31 formed in the housing 3.

The hinge axis receiving portion 41 may be rotatably supported by the hinge axis 31.

The hinge axis receiving portion 41 may be formed on the upper portion of the support bracket 4. The hinge axis receiving portion 41 may protrude from the upper portion of the front of the support bracket 4 based on the vehicle driving direction.

The hinge axis receiving portion 41 may correspond 1:1 with the hinge axis 31. A pair of hinge shaft receiving portions 41 may be provided, and a pair of hinge shaft receiving portions 41 may comprise a left hinge shaft receiving portion that is rotatably supported by a hinge shaft 31 formed on the left side of the housing 3, and a right hinge shaft receiving portion that is rotatably supported by a hinge shaft 31 formed on the right side of the housing 3.

The support bracket 4 may be tilted at a tilting angle θ2 or restored to a reference angle θ1 around the hinge shaft 31.

A slider rail 42 that guides a slider 6 may be formed on the support bracket 4.

The slider rail 42 may be formed on the front surface of the support bracket 4. The slider rail 42 may be formed long in the up and down direction Z on the front surface of the support bracket 4.

The support bracket 4 may be formed with a fastening portion 43 to which at least one of the button cover 8 and the cover body 9 is fastened.

The support bracket 4 may be formed with a mirror fastening portion 44 fastened to a mirror M.

The mirror fastening portion 44 may be formed on the upper portion of the support bracket 4.

The support bracket 4 may be formed with a rear spring sheet 45 that supports a damping spring 13.

The rear spring sheet 45 may be formed on the front surface of the support bracket 4. The rear spring sheet 45 may be spaced apart from the front spring sheet 35 in the front and rear direction X.

The support bracket 4 may comprise a main bracket 4A; and a cover bracket 4B.

The main bracket 4A may be fastened to the mirror M.

The main bracket 4A may be formed with a hinge axis receiving portion 41, a slider rail 42, a fastening portion 43, and a mirror fastening portion 44.

The cover bracket 4B may be fastened to the main bracket 4A.

The cover bracket 4B may be formed with a mirror fastening portion 44 and a rear spring sheet 45.

When the support bracket 4 comprises the main bracket 4A and the cover bracket 4B, the hinge axis 31 of the housing 3 may be easily inserted into the hinge axis receiving portion 41 of the main bracket 4A while the main bracket 4A and the cover bracket 4B are separated, and the housing 3 and the support bracket 4 may be easily assembled.

With the housing 3 being rotatably connected to the main bracket 4A, the rear bracket 4B may be coupled to the main bracket 4A.

The tilting module 5 may be mounted on the support bracket 4.

The tilting module 5 may tilt or untilt the support bracket 4 as shown in FIG. 5 and FIG. 6 based on the housing 3.

The tilting module 5 may comprise a slider 6, a main spring 7, a button cover 8, a cover body 9, a button 10, a stopper 11, and a reset button 12.

The slider 6 may be slidably mounted on the support bracket 4. The slider 6 may be raised and lowered along the support bracket 4.

The slider 6 may be formed with a sliding guide 61 that is guided to be raised and lowered along the slider rail 42 formed on the support bracket 4.

The sliding guide 61 may be formed to protrude on each of the left and right sides of the slider 6. The sliding guide 61 may be provided in pairs on the slider 6, and the pair of sliding guides 61 may comprise a left sliding guide and a right sliding guide.

The slider 6 may be formed with a lower spring seat 62 on which the main spring 7 is seated.

The lower spring seat 62 may be formed in the center of the left and right direction of the slider 6.

The lower spring seat 62 may be formed to be recessed in a downward direction on the upper surface of the lower portion of the slider 6.

The slider 6 may be formed with a button contact body 63 that comes into contact with the button 10.

The button contact body 63 may be formed in the center of the left and right direction of the slider 6.

The button contact body 63 may be formed to protrude downward on the lower surface of the lower portion of the slider 6.

The main spring 7 may be disposed between the housing 3 and the slider 6.

The upper portion of the main spring 7 may come into contact with the upper spring sheet 32 formed in the housing 3.

The lower portion of the main spring 7 may come into contact with the lower spring sheet 62 formed in the slider 6.

The main spring 7 may press the slider 6 downward. The main spring 7 may be compressed by the slider 6 when the slider 6 rises. When the external force due to the button 10 is removed, the slider 6 may be lowered by the restoring force of the main spring 7.

The button cover 8 may be mounted on the support bracket 4. The button cover 8 may be mounted on the lower portion of the support bracket 4.

The button cover 8 may be formed with a fastening member 81 that is fastened to the support bracket 4.

The button cover 8 may be a front cover disposed on the front surface of the cover body 9.

A button space in which a button 10 may be received so as to be lifted may be formed between the button cover 8 and the cover body 9.

The cover body 9 may be coupled with the button cover 8. The cover body 9 may be coupled on the rear surface of the button cover 8. The cover body 9 may be a cover that covers the space formed in the button cover 8. The cover body 9 may be a rear cover disposed on the rear surface of the button cover 8.

The cover body 9 may be formed with a button hole 91 through which the reset button 12 is moved forward and backward in the front and rear direction X. The button hole 91 may surround the outer circumference of the reset button 12.

The cover body 9 may be coupled to the button cover 8. A coupling portion 92 may be formed on the cover body 9. The coupling portion 92 may comprise a coupling ring 93 protruding from the cover body 9. The coupling portion 92 may comprise a coupling boss 94 formed on the cover body 9.

The button 10 may be disposed so as to be able to move up and down between the button cover 8 and the cover body 9.

The button 10 may support the slider 6. The button 10 may support the slider 6 from the lower side of the slider 6. The button 10 may raise the slider 6.

A protruding body 101 that comes into contact with the slider 6 may be formed on the upper end of the button 10.

A button protrusion 102 that is caught on a stopper protrusion 111 of a stopper 110 may be formed on the button 10.

A stopper protrusion 111 that catches on the button 10 in the up and down direction Z may be formed on the stopper 11.

The stopper 11 may be disposed to rotate between the button cover 8 and the cover body 9.

A rotation hole 112 may be formed on the stopper 11. The rotation hole 112 may be opened in the front and rear direction X of the stopper 11.

The rotation hole 112 may surround a support shaft 82, shown as FIG. 11 formed on at least one of the button cover 8 and the cover body 9. The stopper 11 may be rotated clockwise or counterclockwise around the support shaft 82, and may be moved in the front and rear direction X along the support shaft 82.

A spring contact body 113 that a stopper spring 14 comes into contact with may be formed on the stopper 11.

The spring contact body 113 may protrude from the outer surface of the stopper 11.

The spring contact body 113 may be spaced apart from the stopper protrusion 111 in the circumferential direction of the stopper 11.

A reset button 12 may be disposed on the cover body 9. The reset button 12 may be disposed to be moved forward and backward in the cover body 9. The reset button 12 may penetrate the button hole 91 of the cover body 9.

The reset button 12 may move the stopper 11 in the front and rear direction X.

The reset button 12 may have a pressing projection formed that contacts the rear surface of the stopper 11 and presses the stopper 11 forward.

When the reset button 12 is pushed forward by the driver, the reset button 12 may press the stopper 11 forward, and the stopper 11 may be pushed forward along the support shaft 82 by the reset button 12.

The mirror assembly may further comprise a damping spring 13.

The damping spring 13 may be disposed between the support bracket 4 and the housing 3.

As shown in FIG. 5, the damping spring 13 may push the rear spring seat 45 of the supporter 4 in the rearward direction so that the support bracket 4 is disposed at a reference angle θ1 when the button 10 is lowered.

As shown in FIG. 6, the damping spring 13 may be compressed by the support bracket 4 tilted at a tilting angle θ2 when the button 10 is raised.

The support bracket 4 is not rotated abruptly by the damping spring 13, and the support bracket 4 may be rotated stably.

The mirror assembly may further comprise a stopper spring 14 and a reset spring 15.

The stopper spring 14 is disposed between at least one of the button cover 8 and the cover body 9 and the stopper 11 and elastically support the stopper 11 in the rotational direction of the stopper 11.

The stopper spring 14 is disposed between the button cover 8 and the stopper 11 and may elastically support the stopper 11 in the rotational direction of the stopper 11.

The reset spring 15 is disposed between the button cover 8 and the stopper 11 and may elastically support the stopper 11 in the front and rear direction X.

The reset spring 15 may be disposed between the rear surface of the button cover 8 and the front surface of the stopper 11. The reset spring 15 may be compressed by the stopper 11. The reset spring 15 may elastically support the stopper 11 in the rearward direction, and when the external force applied to the stopper 11 is removed, the reset spring 15 may push the stopper 11 in the direction of the cover body 9.

FIG. 8 is a perspective view illustrating a housing, a slider, a button, a button cover, and a support bracket according to the present embodiment, and FIG. 9 is a partially cut-away side view illustrating a housing, a slider, a button, a button cover, and a reset button according to the present embodiment.

A rail 34 may be formed on the housing 3 along which the sliding protrusion 64 of the slider 6 is guided.

The rail 34 may have a three-dimensional shape.

The rail 34 may comprise a pair of straight portions 34A and 34B; and a gradient 34C connecting the pair of straight portions 34A and 34B.

The pair of straight portions 34A and 34B may be spaced apart from each other.

One end of the gradient 34C may be connected to one 34A of the pair of straight portions 34A and 34B, and the other end of the gradient 34C may be connected to the other 34B of the pair of straight portions 34A and 34B.

The gradient 34C may extend at a different angle from the extension direction of each of the pair of straight portions 34A and 34B. The extension direction of the gradient 34C and the extension direction of each of the pair of straight portions 34A and 34B may be different.

The extension direction of the gradient 34C may be inclined with respect to the extension direction of each of the pair of straight portions 34A and 34B.

The rail 34 may comprise a starting point P1 and an end point P2, and an imaginary line L connecting the starting point P1 and the end point P2 may be inclined by an inclination angle θ3 with respect to the housing 3.

The starting point P1 may be located at either one 34A of the pair of straight portions 34A and 34B.

The starting point P1 may be the point at which the sliding protrusion 64 is first inserted into the rail 34 and may be defined as the lower end of the rail 34.

The end point P2 may be located at the other 34B of the pair of straight portions 34A and 34B.

The end point P2 may be the point at which the sliding protrusion 64 is finally inserted into the rail 34 and may be defined as the upper end of the rail 34.

FIG. 10 is a rear view illustrating the inside of a button cover when the button according to the present embodiment is lowered, FIG. 11 is a rear view when the stopper illustrated in FIG. 10 is separated, and FIG. 12 is a rear view of the inside of the button cover when the button according to the present embodiment is raised.

At least one of the button cover 8 and the cover body 9 may be formed with a support shaft 82 that rotatably and movably supports the stopper 11.

The support shaft 82 may protrude long from the button cover 8 in the front and rear direction X.

The button cover 8 may be formed with a spring mounting body 83 that supports the stopper spring 14.

The spring mounting body 83 may be formed at the lower portion of the button cover 8.

The lower end of the stopper spring 14 may be seated on the spring mounting body 83 formed on the button cover 8, and The upper end of the stopper spring 14 may be in contact with the spring contact body 113 that protrudes from the stopper 11.

The button 10 may be formed with a button protrusion 102 that is restrained in the up and down direction Z by the stopper protrusion 111.

The button 10 may be formed with an avoidance hole 103 that avoids the stopper 11 and the stopper spring 14.

The button protrusion 102 may protrude from the button 10 toward the avoidance hole 103.

The stopper spring 14 may elastically support the stopper 11 at a locking angle LA.

The locking angle LA may be an angle at which the button 10 is restrained by the stopper protrusion 111. The locking angle LA may be an angle at which the button protrusion 102 of the button 10 is caught by the stopper protrusion 111.

When the button 10 is raised, the button protrusion 102 of the button 10 may be raised, may come into contact with the stopper protrusion 111 of the stopper 11, may push the stopper protrusion 111 upward, and may rotate the stopper 11.

The stopper 11 may be rotated to the unlocking angle ULA by the button protrusion 102 of the button 10, and the button protrusion 102 of the button 10 may pass over the stopper protrusion 111 of the stopper 11.

When the button protrusion 102 of the button 10 is raised to a predetermined height, the stopper 11 may be rotated back to the locking angle LA as shown in FIG. 12 by the restoring force of the stopper spring 14, and the stopper protrusion 111 of the stopper 11 may lock the button 10 so that the raised button 10 is not lowered arbitrarily as shown in FIG. 12.

FIG. 13 is a cross-sectional view of the inside of the button cover when the button according to the present embodiment is raised, and FIG. 14 is a cross-sectional view of the inside of the button cover when the reset button according to the present embodiment is pressed.

The stopper 11 may be retracted along the support shaft 82 to the locking position LP or advanced to the unlocking position ULP.

The locking position LP may be a front and rear position where the button 10 is restrained in the up and down direction Z by the stopper projection 111.

The unlocking position ULP may be a front and rear position where the button 10 is not restrained in the up and down direction Z by the stopper projection 111.

The unlocking position ULP may be located forward of the locking position LP.

The reset spring 15 may support the stopper 11 to the locking position LP where the button 10 is restrained in the stopper projection 111 of the stopper 11.

The stopper 11 may be moved backward by being pushed by the reset spring 15 and may be moved to the locking position LP.

When the driver presses the reset button 11 forward as shown in FIG. 14, the stopper 11 may be moved forward to the unlocking position ULP that does not restrain the button 10 in the up and down direction.

When the stopper 11 does not restrain the button 10, the button 10 may be lowered downward by the restoring force of the main spring 7.

When the driver removes the external force applied to the reset button 12, the reset spring 15 moves the stopper 11 backward by the restoring force as shown in FIG. 13, and the stopper 11 may retract the reset button 13 in the backward direction.

The above-disclosed subject matter is to be considered illustrative, and not restrictive, and the appended claims are intended to cover all such modifications, enhancements, and other implementations, which fall within the scope of the present disclosure.

Therefore, the embodiments disclosed in the present invention are not intended to limit the technical idea of the present invention but to explain it, and the scope of the technical idea of the present invention is not limited by these embodiments.

The scope of the present disclosure is defined by the following claims, and all differences within the scope will be construed as being comprised in the present disclosure.

The invention claimed is:

1. A mirror assembly comprising;

a housing;

a support bracket rotatably disposed on the housing and coupled to a mirror; and a tilting module mounted on the support bracket and tilting or untilting the support bracket relative to the housing, wherein the tilting module comprises:

a slider slidably mounted on the support bracket;

a main spring disposed between the housing and the slider;

a button cover mounted on the support bracket;

a cover body coupled with the button cover;

a button disposed between the button cover and the cover body so as to be moved up and down and supporting the slider, a stopper formed with a stopper protrusion that catches the button and rotatably disposed between the button cover and the cover body; and a reset button disposed on the cover body to move the stopper in the forward and backward direction, wherein a sliding protrusion is formed on the slider, and a rail along which the sliding protrusion is guided is formed on the housing.

2. The mirror assembly of claim 1, wherein the rail comprises a pair of straight portions spaced apart each other; and a gradient connecting the pair of straight portions.

3. The mirror assembly of claim 1, wherein a virtual line connecting a starting point of the rail and an end point of the rail is inclined with respect to the housing.

4. The mirror assembly of claim 1, wherein the tilting module comprises a stopper spring disposed between at least one of the button cover and the cover body and the stopper, the stopper elastically supporting the stopper in the rotational direction of the stopper; and a reset spring disposed between the button cover and the stopper, the reset spring elastically supporting the stopper in the front and rear direction.

5. The mirror assembly of claim 4, wherein the stopper spring elastically supports the stopper at a locking angle at which the button is restrained by the stopper projection, wherein the locking angle is a clockwise angle or a counterclockwise angle at which the button is restrained by the stopper projection, wherein the reset spring elastically supports the stopper at a locking position at which the button is restrained by the stopper projection, and wherein the locking position is a front and rear position at which the button is restrained by the stopper projection.

6. The mirror assembly of claim 1, wherein the support bracket comprises a main bracket having a hinge axis receiving portion formed to accommodate a hinge axis formed on the housing; and a cover bracket fastened to the main bracket.

7. The mirror assembly of claim 1, wherein a support axis is formed on at least one of the button cover and the cover body and rotatably and movably supports the stopper.

8. The mirror assembly of claim 1, wherein an avoidance hole is formed in the button for avoiding the stopper and the stopper spring.

9. The mirror assembly of claim 1, wherein a button protrusion is formed in the button and is restrained by the stopper protrusion in the up and down direction.

10. The mirror assembly of claim 1, wherein the tilting module further comprises a damping spring disposed between the support bracket and the housing.

* * * * *